Aug. 2, 1966        N. T. WAKELYN ETAL        3,264,135
METHOD OF COATING CARBONACEOUS BASE TO PREVENT
OXIDATION DESTRUCTION AND COATED BASE
Filed Nov. 28, 1962

INVENTORS
NOEL T. WAKELYN
ROBERT A. JEWELL

BY

ATTORNEYS

United States Patent Office 3,264,135
Patented August 2, 1966

3,264,135
METHOD OF COATING CARBONACEOUS BASE TO PREVENT OXIDATION DESTRUCTION AND COATED BASE
Noel T. Wakelyn and Robert A. Jewell, Hampton, Va., assignors to the United States of America as represented by the Administrator of the National Aeronautics and Space Administration
Filed Nov. 28, 1962, Ser. No. 240,760
9 Claims. (Cl. 117—69)

The invention described herein may be manufactured and used by or for the Government of the United States of America for governmental purposes without the payment of any royalties thereon or therefor.

This invention relates generally to the protection of surfaces against erosion and oxidation by applying a protective coating thereto. More particularly, this invention relates to the protection of carbon and graphite bodies from oxidation damage, when in an oxidizing environment, by applying a laminated protective coating thereon that will undergo partial oxidation and form an impermeable protective barrier for the carbonaceous base.

Carbon and graphite base articles have been proven to possess exceptionally good mechanical strength properties when used in the manufacturing of leading edges for high-speed aerial vehicles, rocket nozzles, and protective nose cones for payloads launched into the upper atmosphere by rockets. Graphite, although having good high-temperature strength in comparison with other materials, and having the characteristic that its strength increases with increasing temperature up to about 2,800° K. is, nevertheless, subject to erosion and oxidation damage caused by temperatures above 1,250° K. in the presence of high-velocity steams of oxidizing fluids, such as air, and methods need be devised to protect the graphite from such oxidation damage. Since it is known that some metals, such for example as nickel and aluminum, form their own protective oxide or scale when subjected to an oxidation environment, it is logical to assume that graphite could be similarly protected. However, since graphite produces only gaseous oxides at temperatures at which it rapidly reacts with oxygen and therefore cannot form its own protective scale or oxide, a protective coating must be applied to graphite bodies to permit full utilization of their inherent strength properties in various high-temperature applications. Thus, if graphite could be coated with an oxidation-resistant nonporous barrier, its high-temperature properties would be more capable of utilization.

One previous proposal for protecting graphite and carbon bodies subjected to oxidation damage has been to impregnate the porous graphite body with metallic substances such as carbides or nitrides. This prior art protective measure, although suitable for the purposes intended, does not provide adequate protection from the extremely high velocity flow of oxidizing gases at the temperatures encountered in operation of present-day reentry nose cones, rocket nozzles, and the leading edges of high-speed aerial vehicles.

Another prior art proposal for protecting graphite bodies has been to apply various coatings of carbides and nitrides thereto but these also have not provided the protection needed for present day high-temperature applications.

It is, therefore, an object of the present invention to provide a new carbonaceous article of manufacture which will be protected from oxidation damages by oxidizing fluids at high temperatures.

Another object of this invention is to provide a carbonaceous article having an oxidation protective laminated coating thereon.

A further object of the present invention is to provide a carbonaceous article substantially resistant to oxidation damage during high-speed aerial flight.

Still another object of the present invention is to provide a method for protecting graphite articles that are subjected to an oxidation environment.

A still further object of the instant invention is to provide a method of preventing the oxidation destruction of a carbonaceous body.

An additional object of the present invention is to provide a protective coating for carbon articles which will form impermeable barrier protection for the carbon when subjected to high temperatures.

According to the present invention, the foregoing and other objects are obtained by applying a protective coat of nitride onto the surface of a carbon base by the vapor deposition process, and then applying a layer of silicon onto the nitride coating by a conventional process, such as vapor deposition.

A more complete appreciation of the present invention and many of the attendant advantages thereof will be readily appreciated as the same becomes better understood by reference to the following detailed description when considered in connection with the accompanying drawing wherein.

Figure 1:
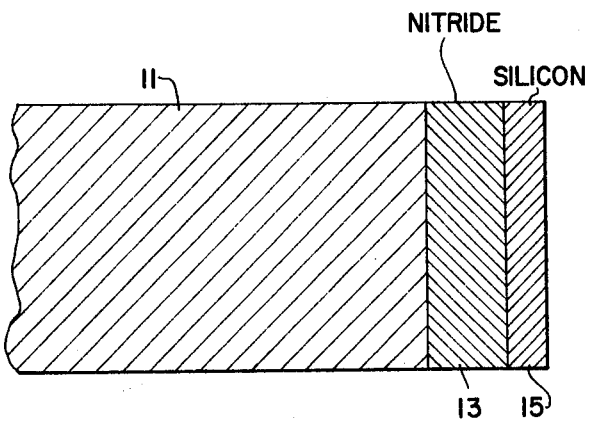
FIG. 1 is a partial sectional view of a carbonaceous body having a laminated coating thereon in accordance with the present invention.
Figure 2:
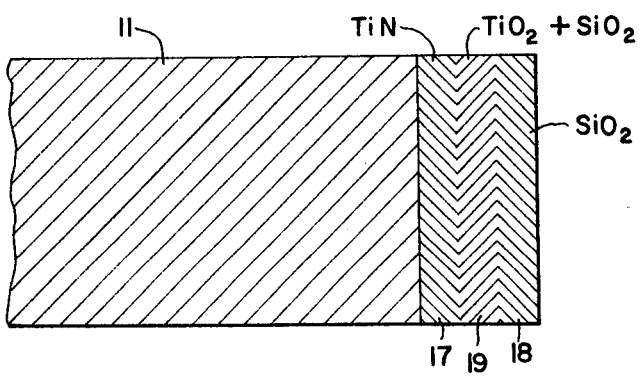
FIG. 2 is a view similar to FIG. 1 showing one laminated coating of the present invention after being subjected to high temperature, high velocity, oxidizing fluid flow.

Referring now to the drawings and more particularly to FIG. 1, there is shown a carbon or graphite article 11 having a protective coat of nitride 13 integrally applied thereto with a further lamination of silicon 15 applied to the coating of nitride. FIG. 2 shows the results of the chemical reaction that occurs when the coated graphite article 11 having a titanium nitride layer 17 is subjected to high velocity, high temperature, fluid flow, such for example, as the conditions encountered during high velocity aerial flight, or as encountered in the nozzles of rockets. When article 11 is subjected to the aforementioned environmental conditions, the layer of silicon 15 is oxidized to form a protective layer of silicon dioxide 18 on the external surface of article 11 with an intermediate layer 19, consisting of titanium dioxide and silicon dioxide being formed adjacent the external surface of the titanium nitride coating 13.

It is thus seen that the graphite or carbon material 11 can be protected from severe oxidation damage by the application of a protective laminated coating as in the present invention to thereby form an oxidation-resistant nonporous barrier of nitride and silicon dioxide.

*Example I*

The titanium nitride coating 17 as shown in FIG. 2 may be applied to graphite body 11 by the well known hydrogen reduction variation of the vapor deposition process. In this process, a gaseous mixture of hydrogen, nitrogen, and titanium tetrachloride is passed over the heated carbon, or graphite body and a golden-hued titanium nitride coating is formed on the surface of the graphite. The commercial grade hydrogen used in the present invention was found to contain sufficient nitrogen as an impurity, for example 200–500 parts per million, to make a separate addition of nitrogen unnecessary although it is readily apparent to those skilled in the art that additional nitrogen may be added to the reaction in the form of nitrogen or ammonia gas, when required or if so desired. The mixing of the reactant gases is achieved by passing hydrogen through the volatile liquid, titanium tetrachloride, at room temperature.

This gaseous mixture is then passed over the surface of carbon body 11 contained in a suitable reaction vessel which has previously been heated by suitable apparatus, such for example as an induction furnace, to the desired temperature. An inert gas, such for example as argon, is used to purge the reaction vessel system before coating to remove any impurities therein. Coating times of approximately twelve minutes produces roughly 20 mg. of titanium nitride per square centimeter of graphite substrate surface in the form of a thin coating of one-two mils thickness. The rate of hydrogen flow employed in the present example was approximately 1.6 liters per minute, although this is not considered critical to the reaction. Free silicon is readily deposited onto titanium nitride by the hydrogen reduction of silicon tetrachloride, the latter being held at room temperature, while the temperature of the titanium nitride coated carbon base is maintained at approximately 1,100–1,400° C.

The hydrogen reduction of silicon tetrachloride is very sensitive to the presence of impurities and it is essential to employ a carefully purified hydrogen gas source, that is, a hydrogen gas essentially free from any oxygen, when obtaining substantially pure silicon coatings. A relatively high hydrogen flow rate, 100–200 liters per hour, applied transverse to the longitudinal axis of the substrate being coated produced the desired coating in the present invention, although obviously this rate can vary within the scope of this invention. The quantity of silicon coating applied in the present example is in the range of 20–30 mg. weight per unit area while that of titanium nitride is 140–210 mg. weight per unit area or a ratio of approximately 7:1 of titanium nitride to silicon. This ratio can be varied within limits without departing from the scope of the invention.

It is apparent to those skilled in the art that the titanium nitride coating 17 when used alone would be oxidized by high temperature gaseous flow and would result in a titanium dioxide coating, the rutile modification of titanium, which would act as a barrier to the oxidizing gases under some circumstances. However, for use in present-day aerial vehicles, spacecraft and rocket nozzles, it is necessary to provide a much thicker coating of titanium nitride than that discussed hereinbefore for adequate protection during long period exposures to an oxidation environment. Since total mass is a critical factor in the design and construction of these articles, the advantages of the present invention are therefore apparent. That is, by applying a thin protective coat of silicon 15 over the titanium nitride coating 17 the same or better degree of protection can be obtained for a graphite substrate as that from a relatively thick titanium nitride coat alone, but with a much less total weight of the titanium nitride-silicon deposit being required.

As shown more particularly in FIG. 2, when the coated article described hereinbefore is subjected to heat with temperatures in the range of 2,600°–3,200° F. for a period of time, usually a few minutes or more, the silicon layer is readily oxidized into silicon dioxide with the titanium nitride layer forming a lattice network and an intermediate layer 19 of titanium dioxide and silicon dioxide being formed and impregnating part of the lattice work formed by the titanium nitride layer 17. This protective layer of oxide acts as a gaseous impermeable barrier and serves to prevent the oxidation destruction of the graphite substrate and thereby enables the use of the graphite in extremely high temperature applications where it would otherwise be readily oxidized, eroded, and made substantially worthless.

*Example II*

Figure 3:
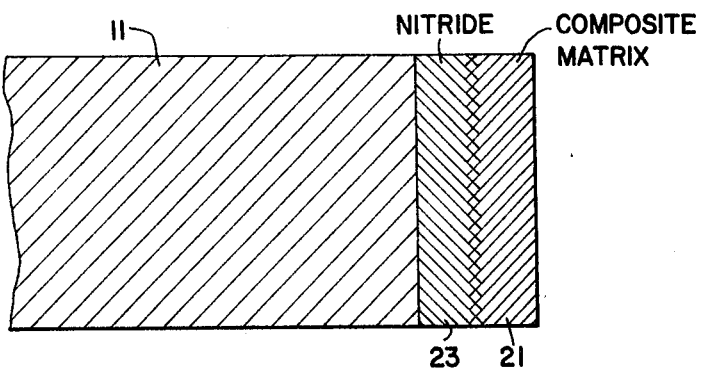
FIG. 3 is a sectional view of a carbonaceous body illustrating a modification of the laminated coating of the present invention.

As shown in FIG. 3, an alternate embodiment of the present invention involves applying a thin coating of nitride 23 onto the graphite substrate 11 by any conventional process, such for example as that discussed hereinbefore for titanium nitride, and thereafter co-depositing a matrix 21 of titanium and silicon onto the nitride layer. The titanium and silicon matrix 21 is readily deposited onto the nitride layer 23 by the hydrogen reduction of a silicon tetrachloride-titanium tetrachloride solution in the presence of nitrogen. Commercial grade hydrogen gas, as mentioned heretofore, normally contains 200–500 parts per million of nitrogen which is an adequate amount for this process. The most uniform coating results are obtained by maintaining the silicon tetrachloride-titanium tetrachloride solution concentration essentially inversely proportional to the respective vapor pressures of the ingredients, that is, approximately two parts titanium tetrachloride to one part silicon tetrachloride are used when the matrix consists of titanium and silicon. In this Example, the titanium-silicon matrix 21 penetrates into the lattice network of the nitride coating 23 as formed and, upon being subjected to oxidizing heat for a period of time, in the temperature range of 2,600°–3,200° F., readily converts into a gaseous impermeable layer of titanium dioxide and silicon dioxide to thereby protect the graphite substrate 11 from oxidation. The coating temperature range and the ratio of nitride to the titanium-silicon matrix employed in this example are essentially the same as those described in Example I.

Tests in a resistance heating facility have also indicated that the titanium nitride plus silicon formulation coatings of the present invention undergo cyclic heating without spalling, whereas plain titanium nitride spalls after one or two cycles of being heated to approximately 1,300° C. and withdrawn from the furnace and exposed without delay to a blast of cold air.

It is to be understood that the above described processes and coated articles are given by way of example only and that numerous modifications are readily apparent to those skilled in the art. For example, although the above coating examples have been described with reference to a graphite substrate, it is obvious to those skilled in the art that other suitable substrates may be coated by the nitride and silicon laminations when desirable to present oxidation-resistant protection therefor.

Also, the use of other high melting point-high stability nitrides as substrate coatings to which the lamination of silicon may be applied are within the scope of this invention. The nitrides of zirconium, hafnium, niobium, tantalum and beryllium obviously fall within this category. Each of these nitrides is capable of being formed on a graphite or other suitable substrate by the hereinabove described hydrogen reduction variation of the vapor deposition process, with obvious variations in the substrate temperatures and the halides employed for the individual processes. Each of these nitrides also reacts with silicon when subjected to a high temperature oxidation environment to form a gaseous impermeable oxide barrier. Zirconium, for example, having a higher melting point and, accordingly, being more stable than titanium may be used where protection beyond the temperature capability range of titanium is needed.

Boron, aluminum, silicon, and vanadium form relatively high melting nitrides which decompose when subjected to temperatures far below their melting points and, accordingly, are not practical for use in the present invention.

The low melting-highly unstable or excessively reactive nitrides of calcium, barium, magnesium, cerium, lanthanum, scandium, yttrium, the rare earth metals, lithium, chromium, molybdenum, tungsten and manganese are likewise not practical for use in the present invention since they will not react with silicon to form the needed gaseous impervious protective oxide barrier.

It is therefore to be understood that within the scope of the appended claims, the invention may be practiced otherwise than as specifically described.

What is claimed and desired to be secured by Letters Patent of the United States is:

1. A coated base having an oxidation protective coating thereon comprising: a carbonaceous member, a coat of a high melting point high stability nitride integrally formed on an exposed surface of said carbonaceous member, said nitride coating being selected from the group consisting of the nitrides of titanium, zirconium, hafnium, niobium, tantalum and beryllium, and an overcoat of silicon covering said nitride coating.

2. A coated base according to claim 1 wherein the ratio of nitride coating to the silicon coating per unit area is approximately 7 to 1.

3. A coated base having an oxidation protection coating thereon, comprising: a carbonaceous base, a laminated coating for said carbonaceous base, said coating including a first layer of nitride of about one–two mils thickness intimately secured to said carbonaceous base and a second layer of silicon spaced from said base a distance equal to the thickness of said first layer and in intimate contact with said first layer and wherein said nitride is selected from the group consisting of the nitrides of titanium, zirconium, hafnium, niobium, tantalum and beryllium.

4. An oxidation protected coated base comprising: a base surface, a laminated coating for said surface, said laminated coating including at least one–two mils thickness layer of a metal nitride and a layer of silicon covering said nitride layer, said laminated coating having the inherent chemical property characteristic of undergoing oxidation to form a protective oxide layer for said surface when subjected to oxidizing fluid flow and metal nitride being titanium nitride.

5. An oxidation protected coated base comprising: a base surface, a laminated coating for said surface, said laminated coating including at least a one-two mils thickness layer of a metal nitride and a layer of silicon covering said nitride layer, said laminated coating having the inherent chemical property characteristic of undergoing oxidation to form a protective oxide layer for said surface when subjected to oxidizing fluid flow and said metal nitride being zirconium nitride.

6. A coated base having an oxidation protective coating thereon comprising: a base surface, a laminated coating for said surface, said laminated coating including a one–two mils thickness metal nitride layer and a composite layer said nitride layer being selected from the group consisting of the nitrides of titanium, zirconium, hafnium, niobium, tantalum and beryllium and said composite layer consisting of silicon and titanium.

7. An oxidation protective coating for a carbonaceous base comprising, in combination: a carbonaceous base, a laminated coating for said base, said laminated coating including a nitride layer and a composite layer, said nitride layer being selected from the group consisting of the nitrides of titanium, zirconium, hafnium, niobium, tantalum and beryllium and having the physical property characteristic of presenting a lattice network surface area, said composite layer consisting essentially of two parts titanium and one part silicon and having the physical property characteristic of penetration a distance into said lattice network of said nitride layer, said composite layer also having the chemical property characteristic of forming a gaseous impermeable barrier when subjected to an oxidizing fluid environment to thereby protect said carbonaceous base from the oxidizing fluid action.

8. A method of preventing oxidation destruction of a graphite base member comprising the steps of: providing a graphite base member, vapor depositing a one–two mils thickness layer of a metal nitride onto the surface area of said graphite base and vapor depositing a layer of silicon onto said nitride layer, said metal nitride being selected from the group consisting of titanium, zirconium, hafnium, niobium, tantalum and beryllium.

9. A method according to claim 8 wherein the ratio of said nitride coating layer to said silicon layer per unit area is approximately 7 to 1.

References Cited by the Examiner
UNITED STATES PATENTS

| | | | |
|---|---|---|---|
| Re. 24,231 | 10/1956 | Matejka | 117—46 |
| 2,946,668 | 7/1960 | Richelsen | 117—46 |
| 3,054,694 | 9/1962 | Aves | 117—46 |
| 3,177,084 | 4/1965 | Amstein | 117—46 |
| 3,178,308 | 4/1965 | Oxley et al. | 117—107 |

MURRAY KATZ, *Primary Examiner.*

WILLIAM D. MARTIN, *Examiner.*